A. H. MIDGLEY.
GENERATION, CONTROL, AND TRANSMISSION OF ELECTRIC ENERGY, PARTICULARLY
FOR USE ON AUTOMOBILES AND LIKE VEHICLES.
APPLICATION FILED FEB. 26, 1908.
904,794.
Patented Nov. 24, 1908.
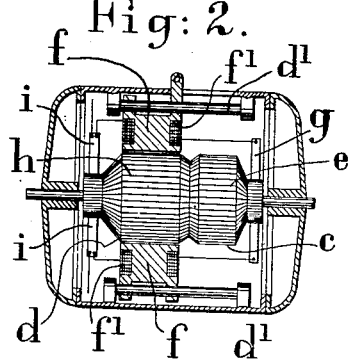
Fig: 2.
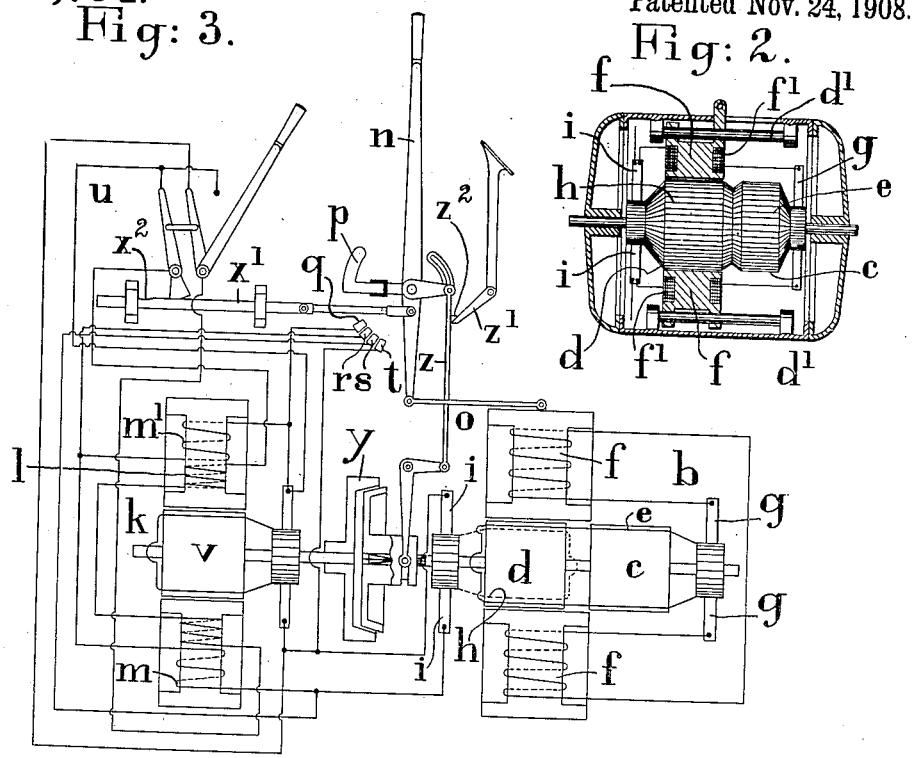
Fig: 3.
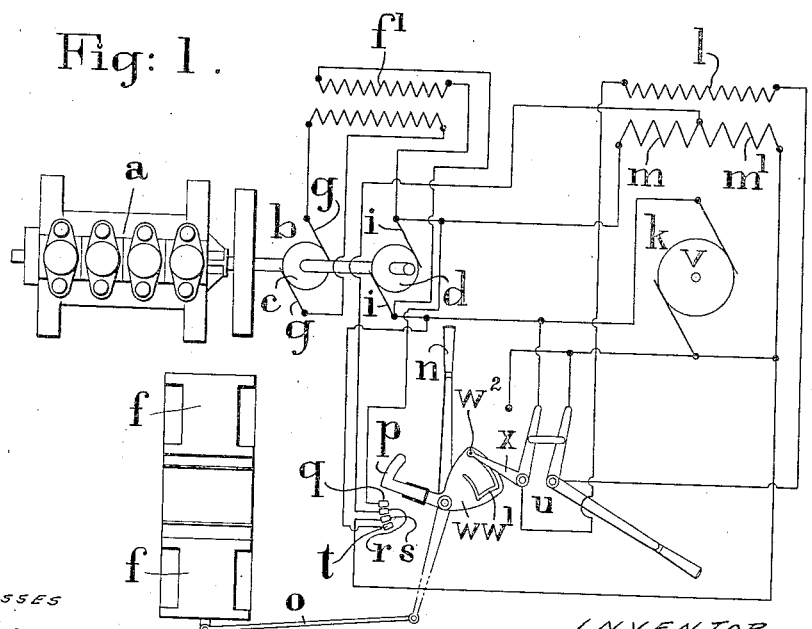
Fig: 1.
WITNESSES
W. P. Burk
W. H. Kennedy
INVENTOR
Albert Henry Midgley

UNITED STATES PATENT OFFICE.

ALBERT HENRY MIDGLEY, OF LONDON, ENGLAND.

GENERATION, CONTROL, AND TRANSMISSION OF ELECTRIC ENERGY, PARTICULARLY FOR USE ON AUTOMOBILES AND LIKE VEHICLES.

No. 904,794.　　　　　Specification of Letters Patent.　　　Patented Nov. 24, 1908.

Application filed February 26, 1908. Serial No. 417,948.

*To all whom it may concern:*

Be it known that I, ALBERT HENRY MIDGLEY, a subject of the King of Great Britain and Ireland, residing at London, England, have invented new and useful Improvements in and Relating to the Generation, Control, and Transmission of Electric Energy, Particularly for use on Automobiles and Like Vehicles, of which the following is a specification.

This invention relates to the generation, control and transmission of electric energy and is particularly applicable for use in automobiles and the like vehicles.

The invention has for its object the construction and system of arrangement of mechanism whereby the mechanical energy of an automatically controlled prime mover is transformed into electrical energy in proper amount in an easily controllable manner by the person in charge and is re-transformed into mechanical energy at the desired point for example the vehicle wheels, without the use of secondary batteries or of a complicated electric controller with its numerous contacts as at present used in known systems of transmission.

To carry my invention into effect I use any kind of prime mover which can be automatically controlled from zero to maximum load within a small range of speed and I couple or connect to this prime mover a dynamo electric generator having two armatures one of which has only a small number of coils adapted to energize the field magnets. The other armature is adapted to absorb the full power of the prime mover and generate current which can be taken off the commutator by brushes in the usual way, a shunt circuit from this armature for the field magnets being also provided as usual. The field magnets are adapted to move in an axial direction over these two armatures so that the voltage generated increases as the field magnets are moved over the main operative armature and vice versa. The current thus generated is taken to one or more electro-motors mechanically connected to the mechanism to receive the motion, for example the wheels of the vehicles.

I provide means which may be hand or foot operated for effecting the variation in the relative position of the field magnets and the two armatures so that the variation in the voltage transmitted by the generator to the motor or motors can be made to suit the conditions relative to the mechanical resistances to be overcome.

I arrange in connection with the operating means for the generator field magnets, switch arrangements by which the armature coils of the motor are short-circuited and I arrange a reversing switch acting in conjunction with the said operating means by which the direction of current in the series coils of the field magnets is reversed in order to obtain a reverse motion in the motor or motors.

In the case of using compound wound motors I arrange the reversing switch on the shunt coil circuit of the field magnets and I provide switching devices which act in conjunction with the operating means so that the series coil is first short-circuited and then the motor armature is short-circuited whereby the braking effect of the electric devices is arranged to act in three different stages of effect, viz:—1st. when the series and shunt coils of the field magnets of the motor are arranged in opposition to one another, when the motor becomes a generator, 2nd. when the series coils are short-circuited which may be done in steps, and 3rd. when the motor armature is short-circuited.

It will be noted that the function of the supplementary armature of the generator is to build the field up in the generator from that due to the residual magnetism to that of the maximum obtained by current excitation and also whatever the position of the armatures relative to the field may be, the field is always maintained at the proper relative strength.

In order that the invention may be the better understood I will now proceed to describe the same in relation to the accompanying drawing and to the letters and figures marked thereon.

Figure 1 is a diagrammatic representation of the electrical mechanism arranged in accordance with my invention. Fig. 2 is a view showing the double armatured generator separately. Fig. 3 is a modified arrangement provided with a connecting clutch to couple the generator and motor together mechanically.

The prime mover $a$ is represented in this case by an internal combustion engine and is coupled to the generator $b$ directly. This generator $b$ has two armatures $c$ and $d$, of which the armature $c$ has only a small number of coils $e$ adapted to energize the field magnets $f\,f$ through the brushes $g$ while the other armature $d$ is wound with coils $h$ adapted to absorb the full power of the prime mover $a$, the current generated being taken off by the bushes $i\,i$ in the usual way. A shunt circuit $f^1$ from the armature to energize the field magnets being provided as usual. The field magnets $f\,f$ are adapted to move in an axial direction on guides $d^1$ over the armatures $c$ and $d$ so that the voltage of the current generated can be increased as the field magnets are moved over the armature $d$ and vice versa.

The current collected by the brushes $i, i$, is taken to an electro-motor $k$ or electro-motors mechanically connected with the mechanism to receive the motion, for example the wheels of a vehicle. Each motor $k$ is preferably fitted with shunt coils $l$ and series coils $m, m^1$ on the field magnets.

The movement of the field magnets $f\,f$ is effected by any convenient mechanism such as a hand lever $n$ and connecting rod $o$ in connection with which is a switch arm $p$ adapted to make contact with terminals $q\,r\,s$ and $t$ so that when $q$ and $r$ are connected the series coils $m$ on one field magnet of the motor $k$ are short-circuited, when $s$ is connected the series coils $m^1$ on the other field magnet are then short-circuited and when $t$ is connected the armature $v$ is short-circuited.

In this arrangement it will be noted that when the vehicle is running down hill and the motor $k$ is acting as a generator the current in the series coils $m\,m^1$ will be reversed and put in opposition to the shunt coils $l$ this will weaken the field and produce a braking effect, if the speed is to be further reduced then the hand lever $n$ is moved, first short-circuiting coils $m$, then coils $m^1$ and finally in the extreme position short-circuiting the armature $v$ when the greatest electrical braking effect is produced.

In order to reverse the direction of rotation of the motor $k$ a reversing switch $u$ is inserted in the circuit of the shunt coil $l$ and means are provided to interlock the movement of the reversing switch $u$ with the hand lever $n$. The form shown in Fig. 1 of these interlocking means consists of a double slotted quadrant $w$ with a radially disposed connecting slot $w^1$, the quadrantal slots form locking means for the pin $w^2$ carried by the lever $x$ attached to and operated with the reversing switch which permits the reversing switch to be operated only when the field coils and armature of the motor $k$ are short-circuited while the lever $n$ can be put into any intermediate position with the reversing switch remaining locked.

In Fig. 3 the mechanism is shown more in its assembled positions and in a more practical form than in Fig. 1 and a mechanical clutch $y$ is provided directly coupling the generator $b$ and motor $k$ together, adapted to be operated by connecting gear $z$ from the lever $n$. A pivoted detent $z^1$ with foot pedal attached is arranged to co-act with a tooth $z^2$ on the connecting gear $z$ to maintain the clutch in its operative position while the lever $n$ is free to move in order to adjust the position of the field magnets $f\,f$ so that the generator $b$ and motor $k$ balance one another as far as action and re-action are concerned, when coupled, in which case the prime mover $a$ is driving direct without electrical intermediation. The locking means for the reversing switch $u$ shown is slightly different in form although the same in function as that shown in Fig. 1, the device is of a well known type and consists of a sliding bar $x^1$ coupled to the lever $n$ and provided with a notch or recess $x^2$ to allow the quadrant lever of the reversing switch to pass, in one position only of the sliding bar $x^1$, while the lever $n$ is free to move for adjusting the position of the field magnets $f\,f$.

Instead of having two sets of coils on the field magnets of the generator $b$ as in Figs. 1 and 2 only one set is used in series with the coils of the armature $c$ but in this case the said coils are taken round both armatures $c$ and $d$ so that the field magnets $f\,f$ are energized to a constant extent whatever may be their relative position with the two armatures $c$ and $d$.

The operation is as follows:—The prime mover $a$ having been started up it runs controlled automatically by its own governor which responds quickly to any change of load; the field magnets $f\,f$ having been placed over the armature $c$ before starting up. To start up the motor $k$ the field magnets are gradually moved over the armature $d$ until a sufficient torque has been set up to overcome the inertia of the vehicle and the speed being regulated by the specific position of the field magnets $f\,f$ to give the required E. M. F. to overcome the resistance of the motor $k$ and to maintain it at the desired speed. If it is desired to drive without electrical intermediation the lever $n$ is drawn back, putting the clutch $y$ into action in which position it is maintained until released by the foot operated detent $z^1$ while the lever $n$ is free to move to adjust the field magnets to balance the effects of the generator on the motor and avoid loss of energy.

Having now described my invention, what I claim and desire to secure by Letters Patent is:—

1. In a system of transmission of energy, a prime mover, a dynamo connected to be driven thereby and having two armatures, a field coil energized by one of said armatures, a second field coil energized by a shunt circuit from the second armature, means for moving said field coils axially with relation to the armatures, and an electric motor connected to receive current from said generator, substantially as described.

2. In combination a prime mover, a dynamo driven thereby having adjustable field magnets, a motor receiving current from the dynamo, said motor having field magnets provided with shunt and series windings, and means operating in conjunction with the adjustment of the field magnets of the dynamo whereby said series windings of the motor field magnets and motor armature are short circuited in turn to set up an electric braking effect, substantially as described.

3. In combination a prime mover, a dynamo driven thereby having adjustable field magnets, a motor receiving current from the dynamo, said motor having field magnets provided with shunt and series windings, and means operating in conjunction with the adjustment of the field magnets of the dynamo whereby said series windings of the motor field magnets and motor armature are short circuited in turn to set up an electric braking effect, and a reversing switch having means for preventing the operation thereof except when the field magnets and armature of the motor are short circuited, substantially as described.

4. In combination a prime mover, a dynamo driven thereby, having an adjustable field, a motor receiving electric energy from said dynamo, a mechanical clutch device for connecting the armature of the motor directly to the armature of the dynamo, and means adjusting the field magnets when said armatures are clutched together to balance the action and reaction of the dynamo and motor, substantially as described.

In testimony whereof I have signed my name to this specification in the presence of two subscribing witnesses.

ALBERT HENRY MIDGLEY.

Witnesses:
R. A. HOFFMANN,
CHARLES CARTER.